H. E. HOLMES.
UTENSIL COVER.
APPLICATION FILED FEB. 7, 1911.
1,025,090.
Patented Apr. 30, 1912.
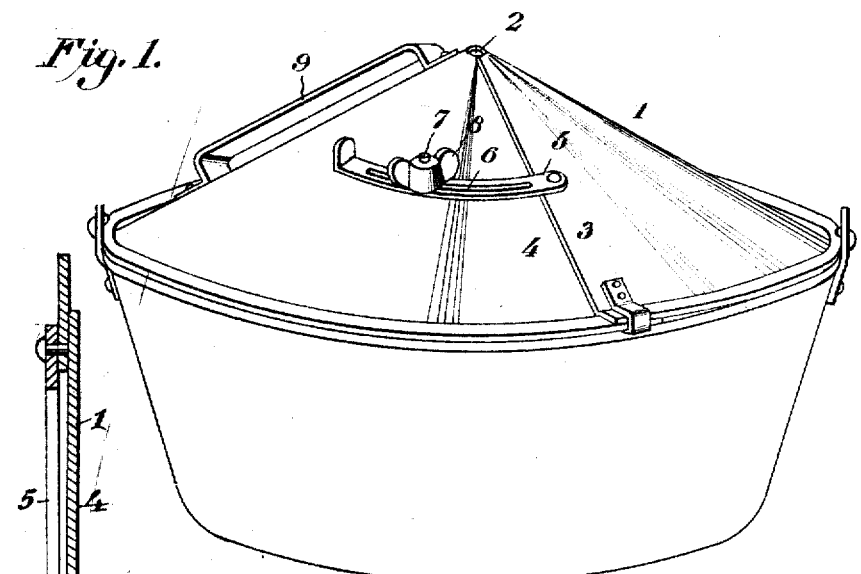
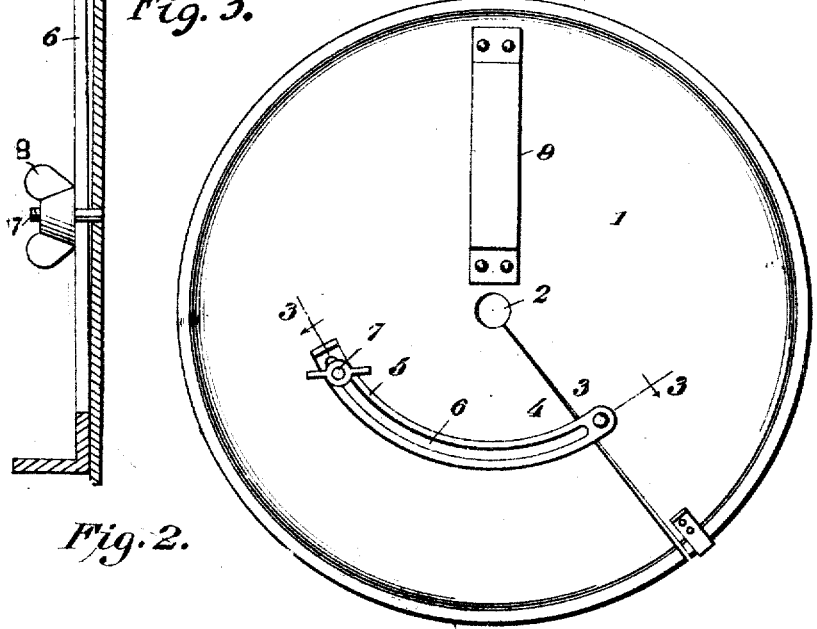
Witnesses
P. B. Salt
Wm. J. Footh
Inventor
Homer E. Holmes.
By Victor J. Evans.
Attorney

UNITED STATES PATENT OFFICE.

HOMER E. HOLMES, OF BURLINGTON, VERMONT.

UTENSIL-COVER.

1,025,090.  Specification of Letters Patent.  Patented Apr. 30, 1912.

Application filed February 7, 1911. Serial No. 607,016.

*To all whom it may concern:*

Be it known that I, HOMER E. HOLMES, a citizen of the United States, residing at Burlington, in the county of Chittenden and State of Vermont, have invented new and useful Improvements in Utensil-Covers, of which the following is a specification.

This invention relates to improvements in covers for utensils and the primary object of the invention is to provide a device of this class which may be readily adjusted to vessels of various sizes, and which may be easily and effectively sustained upon the said vessel.

Another object of the invention is to provide a device of this class constructed of a single piece of suitable flexible material, such as galvanized iron or the like, the same comprising a disk having a radial slit, one of the surfaces adjacent the said slitted portion adapted to be fitted over the second portion so that the two slitted portions upon rotation will be brought to the form of a cone, means being provided for retaining the said members in an adjusted position so as to render the device susceptible to various sizes of utensils.

A still further object of the invention is the provision of a device of this class which, when inverted may serve as a colander or strainer for vegetables or the like when the same is removed from the vessel, normally closed by the cover.

With the above and other objects in view which will be apparent as the description progresses, the invention resides in the novel construction and arrangement of parts hereinafter fully described and claimed.

In the accompanying drawings, Figure 1 is a perspective view of a device constructed in accordance with the present invention, showing the same in applied position upon the vessel. Fig. 2 is a top plan view of the device when the latter is in its spread or flattened position. Fig. 3 is a sectional view upon the line 3—3 of Fig. 2.

In the accompanying drawings, the numeral 1 designates the improved cover. This cover 1 is constructed of a single piece of suitable flexible material, the same being in the shape of a disk as clearly illustrated in Fig. 2. The disk is provided with a central opening 2, and the metal of the disk is slitted from the said opening to its periphery so as to provide what may be termed an overlying edge or portion 3 and an underlying edge or portion 4. The portion 3 has pivotally mounted thereon an arcuate strap 5, the same being formed with a slot 6, also of an arcuate formation, while the member 4 is provided with an upstanding threaded pin 7, which projects through the slot 6 and which has its threaded portion provided with a winged nut 8. By this arrangement it will be noted that the overlying portion 3 of the closure may radially spread from the underlying portion 4 so as to bring the disk to the formation of a cone and at the same time contract the said disk to render the same susceptible to adjustment for use as a closure for various sizes of vessels.

The winged nut 8, contacting the strap 5, will of course, sustain the disk in its adjusted position, and the said disk may, if desired, be provided with a handle 9. It will be noted by reference to the figures of the drawing that the strap 5 has its free extremity provided with an off-set portion formed with a finger, the same being arranged adjacent the substantially U-shaped handle 9. By this construction it will be noted that by exerting a pressure upon the finger and toward the handle 9 the overlying portion 3 of the cover may be drawn over the underlying portion 4 by one hand of the operator, the second hand of the operator being employed to tighten the thumb nut 8 upon the pin 7 to secure the said portions 3 and 4 in a proper adjusted position. It will of course be understood that the arc of travel of the strap 5 upon the threaded pin 7 varies as the disk is contracted or expanded, and for this reason it is essential that the said strap be pivoted so that it can assume different angles without being contacted or stopped by the pin or binding against the pin as the said sections 3 and 4 are expanded or contracted.

From the above description taken in connection with the accompanying drawings, the advantages as well as the simplicity of the device will, it is thought, be apparent to those skilled in the art to which the invention appertains and while I have described the device as a closure or cover for vessels, it is to be understood that the same may be employed for various other purposes, as for instance, a number of disks may be positioned within a vessel, one above the other, so as to provide a plurality of compartments wherein edibles of different natures may all be cooked at one time, the steam from one of the compartments passing through the central opening or through the overlying edges of one of the disks into the upper compartments, and it is to be further understood that while I have illustrated and described the preferred embodiment of the improvement, changes in the minor details of construction within the scope of the appended claims may be made if desired.

Having thus fully described the invention, what I claim as new, is:—

1. A cover for the purpose set forth, comprising a flexible disk, said disk being centrally provided with an opening slitted from said opening to the edge of the disk, one of the portions of the disk provided by the said slit adapted to overlie the second portion, the said overlying portion being provided with a pivoted strap, and means provided upon the underlying portion of the disk for securing the strap to retain the disk either in a contracted or expanded position.

2. A cover of the class described comprising a flexible disk, said disk being centrally provided with an opening and being slitted from the said opening to the edge of the disk whereby one of the portions adjacent the said slit may be permitted to overlie the second portion, an arcuate strap pivotally connected with the overlying portion, the said strap having one of its ends upturned, a handle upon the disk adjacent the upturned end of the strap, the said strap being further provided with an arcuate slot, a threaded pin upon the underlying portion adapted to pass through the slot, and a thumb nut for the said pin and adapted to contact the strap to sustain the underlying portion in an adjusted position with relation to the overlying portion.

In testimony whereof I affix my signature in presence of two witnesses.

HOMER E. HOLMES.

Witnesses:
JNO. P. LADEL,
W. F. ROWELL.